United States Patent [19]
Jung et al.

[11] Patent Number: 5,925,949
[45] Date of Patent: Jul. 20, 1999

[54] DISC DRIVE MOTOR WITH MEANS TO CENTER A DISC AND LIMIT ITS AXIAL MOVEMENT

[75] Inventors: Sung Cheon Jung, Seoul; Jin Ki Min, Kyunggi-do, both of Rep. of Korea

[73] Assignee: Samsung Electro Mechanics Co., Ltd., Suwon, Rep. of Korea

[21] Appl. No.: 08/992,063

[22] Filed: Dec. 17, 1997

[30] Foreign Application Priority Data

Aug. 22, 1997 [KR] Rep. of Korea ............... 97-40124
Aug. 22, 1997 [KR] Rep. of Korea ............... 97-40125

[51] Int. Cl.⁶ ................................... G11B 17/028
[52] U.S. Cl. ................. 310/67 R; 310/254; 310/51; 360/99.08; 360/99.12
[58] Field of Search .................. 310/67 R, 254, 310/51; 360/99.08, 99.12

[56] References Cited

U.S. PATENT DOCUMENTS

| | | | |
|---|---|---|---|
| 4,634,908 | 1/1987 | Sturm | 310/64 |
| 5,264,748 | 11/1993 | Ootsuka et al. | 310/90 |
| 5,446,610 | 8/1995 | Elsaesser et al. | 360/99.08 |
| 5,623,382 | 4/1997 | Moritan et al. | 360/99.08 |
| 5,633,856 | 5/1997 | Mukawa | 369/270 |
| 5,668,792 | 9/1997 | Choi | 369/271 |
| 5,723,927 | 3/1998 | Teshima | 310/90 |
| 5,747,908 | 5/1998 | Saneshige et al. | 310/91 |

*Primary Examiner*—Nestor Ramirez
*Assistant Examiner*—Karl E. Imayoshi Tamai
*Attorney, Agent, or Firm*—Ladas & Parry

[57] ABSTRACT

A brushless DC motor for a disc drive having a base and a coil-wound stator secured to an upper portion of the base. One or more first stoppers are secured to the stator and a shaft is rotatably secured in a bearing forcibly inserted in a bore in the upper portion of the base. A hub of a rotor is secured to the shaft and a cylindrical wall extends downwardly at the rim of the hub and carries a magnet facing the stator with an air gap therebetween. A second stopper is secured to the rotor, to face the first stopper to retain the rotor in the axial direction. The second stopper has a flange over which the first stopper is placed with slight clearance. An elastomer rests on the first stopper and carries guides which extend in slots in the rotor to engage and center a hole in a disc.

8 Claims, 4 Drawing Sheets

FIG. 1
PRIOR ART
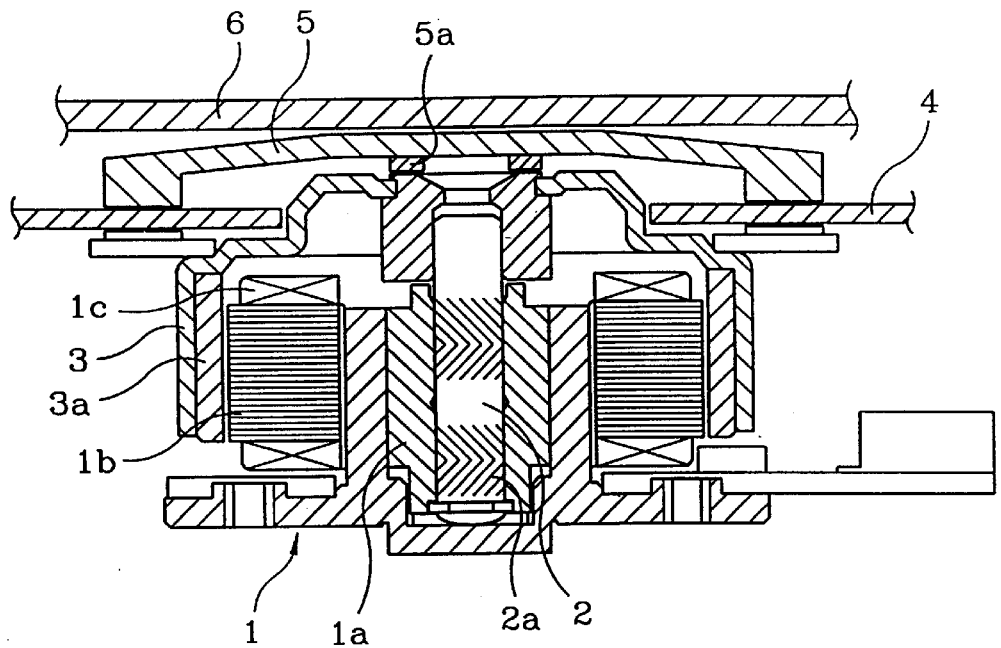
FIG. 2
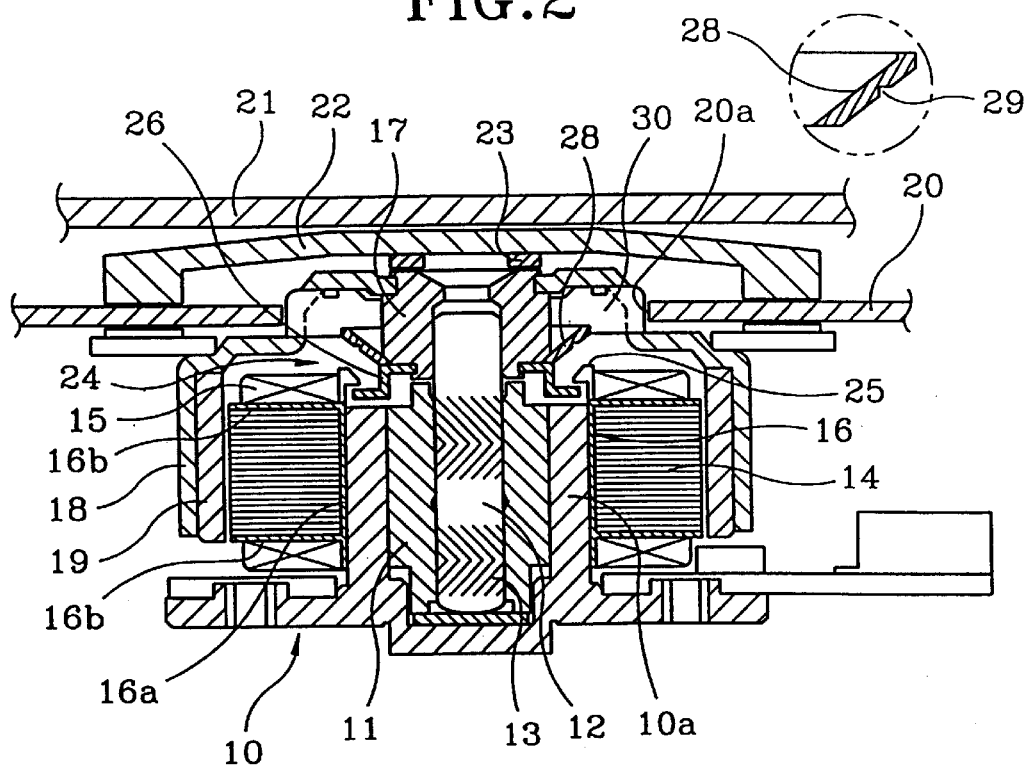
FIG. 2a

DISC DRIVE MOTOR WITH MEANS TO CENTER A DISC AND LIMIT ITS AXIAL MOVEMENT

BACKGROUND OF INVENTION

1. Field of the Invention

This invention relates to a brushless DC motor, more specifically, to a brushless DC motor for a disc drive with higher fidelity which is accomplished by retaining a rotor unmovably in a axial direction using a core insulator and by centering a disc automatically when it is put on the upper end of the rotor.

2. Description of the prior art

Generally, most bearings used in a spindle motor for a digital video disc (DVD) drive or a compact disc (CD) drive are ball bearings or sintered bearings. For these motors, there should be an axially retaining structure which stops the rotor from releasing and maintains the assembled structure when a disc is inserted or removed. It consists of ball bearings and springs to control the pre-pressure of ball bearings in the case of ball bearings while the retaining of sintered fluid bearings is possible through a design of the outer structure of the rotor and the base. However, for a high speed spindle motor of a DVD drive, ball bearings are not proper due to vibration and noise, and the retaining means of the outer structure of the rotor and base has the problem that the power for rotating the rotor is relatively greater.

FIG. 1 is a sectional view of a spindle motor of the prior art using a dynamic pressure bearing. A bearing 1a is forcibly inserted into a bore formed in an upper and central portion of the base. A shaft 2 is inserted into the bearing 1a. A stator 1b is provided on the outer circumferential face of the base 1 and a cap-type rotor 3 is secured to the upper end of the shaft 2. A magnet 3a is provided on an inner circumferential face of the rotor. When power is applied to the coils wound in the stator a magnetic force arises in the magnet and the rotor rotates. On the upper end of the rotor, a disc 4 is located and a disc clamp 5 is provided at the bottom of a door 6.

The conventional spindle motor has a groove 2a for generating a dynamic pressure. When the shaft 2 rotates at high speed, the oil filled between the shaft 2 and the bearing 1a generates dynamic pressure and the shaft 2 is retained in the radial direction by the pressure. While the shaft rotates, a disc located on the upper surface of the rotor rotates and information written in the disc is read. However, the rotor 3 released, or could be moved in the axial direction of the shaft. The shaft is not retained in the axial direction due to the minute space between the shaft 2 and the bearing 1a for generating the dynamic pressure. Therefore, when the grip of the disc clamp 5 is released the rotor 3 could be lifted by magnets formed at the bottom face of the disc clamp 5. To solve the problem a structure between the rotor 3 and the base has been suggested but has failed to meet the requirements of low vibration and noise due to relatively greater unbalance of the rotating rotor. In addition, there has been no desirable means of adjusting the center of rotation of a disc to alleviate unbalance. Insertion of the disc through the hole of the disc into a projection at the upper end of the rotor 3 impairs the loadability of the disc.

SUMMARY OF THE INVENTION

It is an object of this invention to provide a brushless DC motor with higher fidelity wherein the rotor is retained in the axial direction and cannot be released by using a novel structure of a stator insulator which insulates a body from the stator without additional structure, and thus without additional power requirment.

It is another object of this invention to provide a brushless DC motor with higher fidelity wherein the center of a rotating disc is adjusted automatically.

In order to obtain the objects, according to the present invention, there is provided a brushless DC motor for a disc drive comprising:

a base;

a coil-wound stator secured to the upper portion of the base;

one or more first stoppers extending from said stator;

a shaft defining as a rotation axis of said motor;

a bearing system secured to the upper portion of the base to receive the shaft so that said shaft rotates coaxially within said stator;

a rotor having a hub and a cylindrical wall portion extending downward at the rim of said hub, said rotor being secured to said shaft via said hub;

one or more magnets secured to the inner circumferential face of said cylindrical wall portion of said rotor so that said magnets face said stator with an air gap therebetween; and a second stopper secured to said rotor, in such a way that said first stopper blocks said second stopper and said rotor is retained in the axial direction.

By such construction, release of the rotor is repressed.

BRIEF DESCRIPTION OF THE DRAWINGS

FIG. 1 is a sectional view of a conventional motor.

FIG. 2 is a sectional view of the motor according to an embodiment of this invention.

FIG. 2a is an enlarged detail of the embodiment in FIG. 2.

DETAILED DESCRIPTION OF THE PREFERRED EMBODIMENTS

Desirable embodiments according to this invention will be described with reference to the attached Figures.

Figure 3:
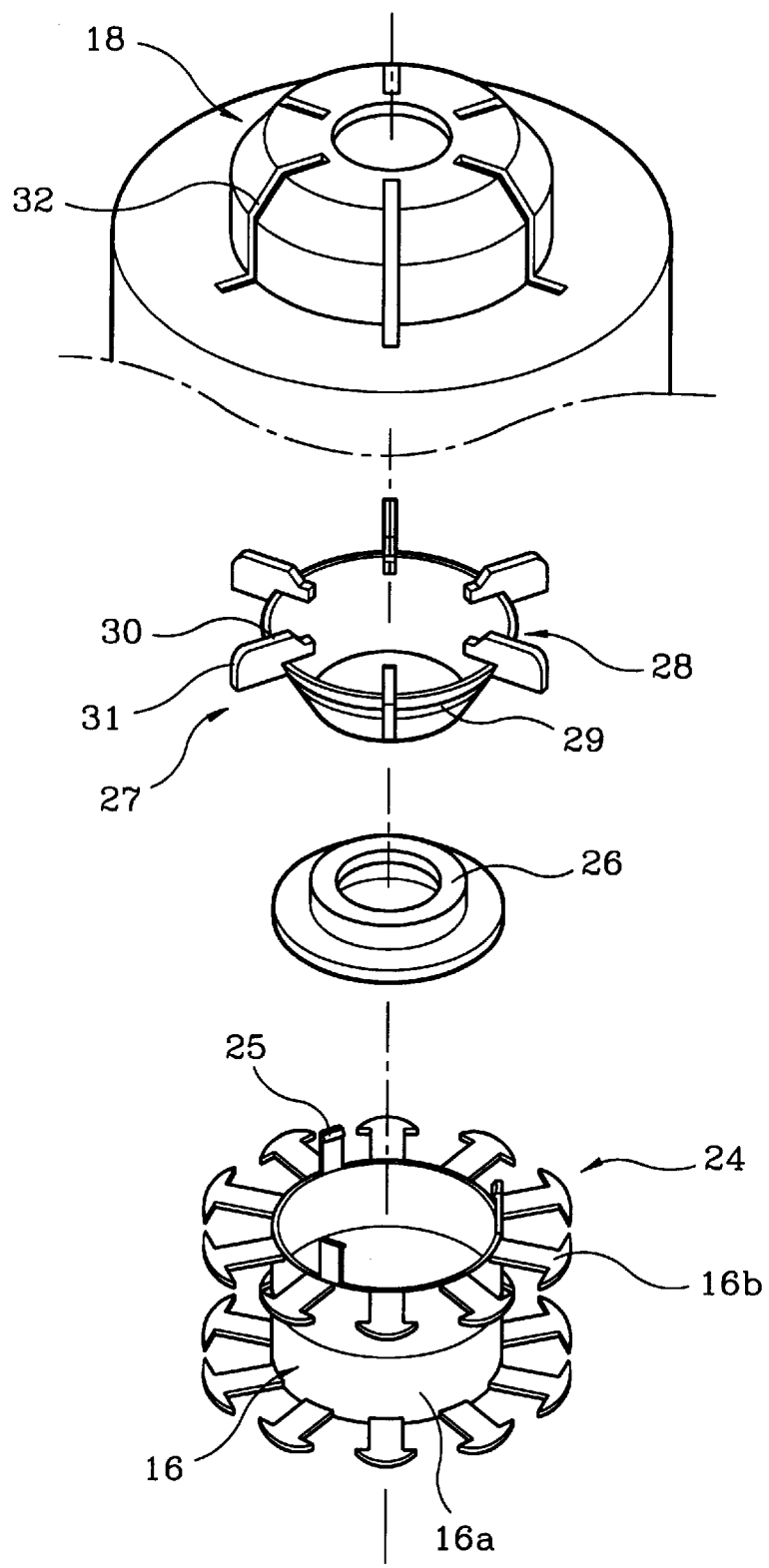
FIG. 3 is an exploded view, in perspective, of a portion of the motor according to the embodiment of FIG. 2.

FIG. 2 is a sectional view of the motor according to an embodiment of this invention. FIG. 3 is an exploded view, in perspective, of a portion of the motor in FIG. 2. A hollow bearing 11 is inserted into a bore at the centeral and upper portion 10a of the base 10. A coil-wound stator 14 is provided at the circumferential face of the upper portion 10a of the base 10. The upper portion 10a of the base is cylindrical and comprises an inner wall for securing a bearing system, an outer wall for securing stator 14 and a top wall connecting the inner and outer walls.

A stator insulator 16 insulates stator 14 from base 10. The insulator consists of a cylinder 16a and two groups of first covers 16b extending outwardly at the top and the bottom ends of the cylinder to overlie the upper and lower ends of the stator as shown in FIG. 2 A shaft 12 is inserted into the hole of the bearing 11. Oil is filled in the space between the shaft 12 and the bearing 11. A dynamic pressure is generated during rotation of the shaft 12 by the grooves 13 formed at the circumferential face of the shaft.

A rotor 18 is located coaxially with the stator 14. The rotor 18 has a hub 17, one or more magnets 19 and a cylindrical wall portion extending downward from the hub. The rotor is engaged with the shaft via the hub. The hub 17 of the rotor 18 is engaged with the shaft 12 at the upper portion of the shaft. The magnets 19 are secured to the inner circumferential face of the cylindrical wall portion of the rotor so that the magnets face the stator with an air gap therebetween. When power is applied to the coils wound in the stator facing the magnets 19 a magnetic force arises in the magnets and the rotor rotates. On the upper surface of the rotor a disc 20 is located and a disc clamp 5 is provided under the door 24. The disc 20 is put on the upper side of the rotor 18. The disc clamp 22 has magnets 23 and rotates idly under the door 21 to press the disc against the upper face of the rotor by magnetic force. A means to oppose lifting of the motor 18 is provided. It opposes the movement of the rotor in the axial direction when the rotor rotates or the disc is lifted off the rotor. A plurality of first stoppers 25 having inward projections at their upper ends are provided at the upper end of the insulator 16a. As seen in FIG. 3 the first stoppers 25 extend axially and are uniformly distributed around the cylinder 16a of the insulator 16. A second stopper 26 is provided at the lower end of the hub 17. The second stopper 26 is hollow circular plate or a flange secured to the lower end of the hub 17. The first stoppers 25 block the second stopper 26 and oppose movement of the rotor 18 in the axial direction.

To adjust the center of the rotor 18 relative to the clamp 22, a center adjusting means is provided which includes an upwardly enlarging conical elastomer 28. The bottom of the conical elastomer 28 lies on the flange of the second stopper 26. A plurality of guides 30 having guide surfaces 31 are provided at the upper end of the elastomer 28. The guides contact the surface of the hole formed in the center of the disc. The guides 30 are inserted into slots 32 formed at the upper portion of the rotor such that, the guide surface 31 extend outward from the slots. The elastomer 28 consists of plastic and as shown in FIG. 2a has a circular V-shape notch 29 formed in the outer surface of elastomer 28 to enhance flexibility.

Hollow bearing 11 is secured in the upper portion 10a of the base 10 and coil-wound stator 14 is secured on the circumferential surface of the base. The insulator 16 is provided to insulate the stator 14 from the base 10. The shaft 12 is inserted into bearing 11. Oil for dynamic pressure is filled in the space between the shaft 12 and the bearing 11. The hub 17 for rotating the rotor is secured to the upper portion of the shaft 12. The second stopper 26 is provided at the lower end of the hub 17 and, a plurality of the first stopper 25 extends axially from the insulator. A gap of about 1 mm exists between the first stopper 25 and the second stopper 26. Therefore, the first stopper 25 and the second stopper 26 do not impede each other and the rotor rotates normally. When the rotor 18 is lifted upwards the gap is decreased and the first stopper blocks the second stopper.

The lift of the rotor 18 occurs as follows. When a disc 20 is put on the upper surface of the rotor 18 and the door is closed the disc clamp 22 presses against the upper portion of the disc. A magnet provided at the bottom of the disc clamp 22 attracts the hub 17 and the disc clamp 22 presses against the upper surface of the disc 20. When power is applied to the coil 15, the magnetic force rotates the shaft 12 and the rotor 18 at high speed and the information written in the disc is read. When the door is opened the rotor stops and then the disc clamp 22 is lifted. At this instant the magnet 23 pulls the hub 17 and the rotor 18 upwardly and could release the rotor. However, according to this invention the first stopper 25 blocks the second stopper 26 and only disc clamp 22 is released.

When a disc is put on the upper surface of the rotor 18 the center of the disc is adjusted automatically. The plurality of guides 30 are exposed at the upper side of the rotor 18. When a disc is put on the upper surface of the rotor 18, the disc is engaged by the guide surfaces 31 of the guides. At this time, the guides descend slightly. The hole 20a of the disc then completely the receive guide surfaces 31 of the guides and the center of the disc 20 is adjusted to the center of the rotor. The groove 29 absorbs a shock of the weight of a disc.

Figure 4:
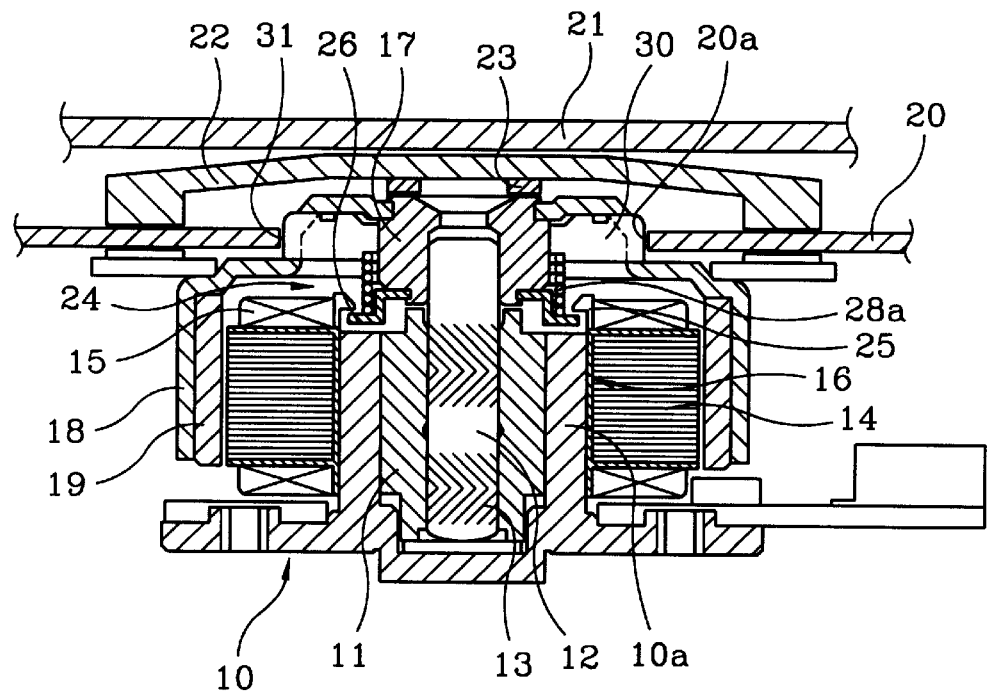
FIG. 4 is a sectional view of the motor according to another embodiment of this invention

FIG. 4 is the sectional view of a spindle motor according to another embodiment of the invention. The same numerals designate the same structure for all embodiments. In this embodiment, the center adjusting means is different from the previous one. The center adjusting means absorbs the shock of the weight of a disc and adjusts the center of the disc to the center of the rotor when the disc is put on the rotor. In the embodiment of FIG. 4a coil spring elastomer 20a is used. The elastomer 20a is fitted on the outer surface of the projection of the hub 17 and the bottom of the elastomer lies on the plate of the second stopper 26. A plurality of guides 30 are disposed radially at the upper end of the elastomer 28a.

The guides 30 have guide surfaces 31 to contact the inner surface of the hole formed in the center of the disc. When the guides 30 are inserted into slots 32 formed at the upper portion of the rotor, the guide surfaces 31 are exposed from the slots. When a disc is put on the upper side of the rotor 18 the center of the disc is adjusted automatically. When a disc is put on the upper side of the rotor, the disc engages the guide surfaces 31 of the guides. At this time, the guides descend slightly. The hole 20a in the disc then completely receives the guide surfaces 31 and the center of the disc 20 is adjusted to coincide with the center of the rotor 18.

Figure 6:
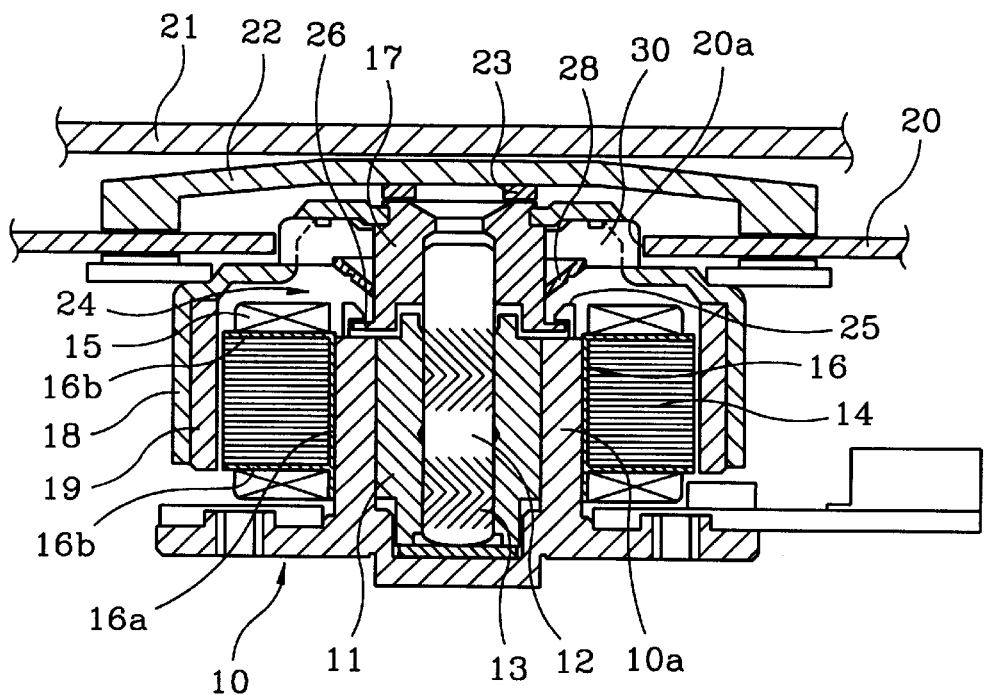
FIG. 6 is a sectional view of the motor according to another embodiment of this invention
Figure 5:
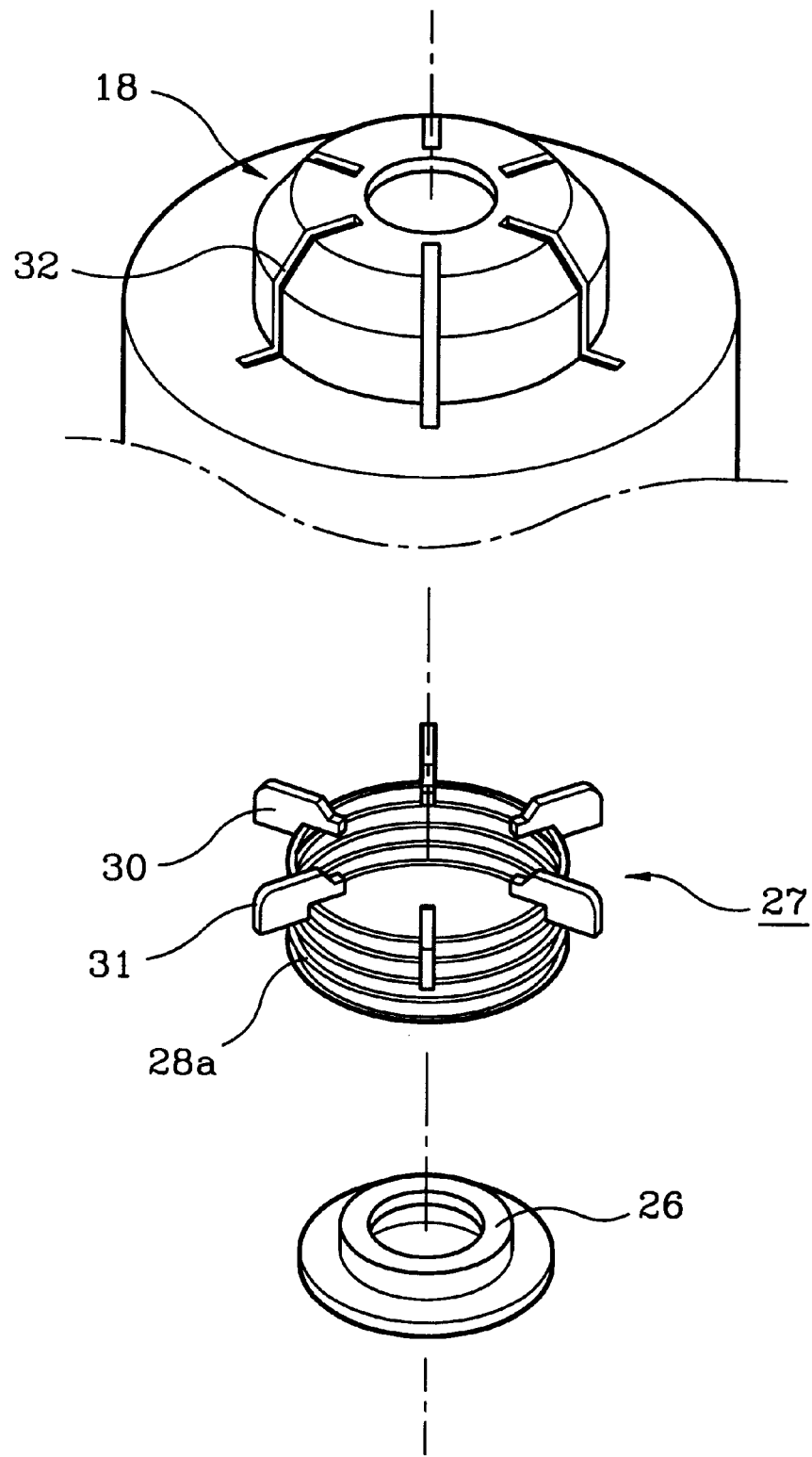
FIG. 5 is an exploded view, in perspective, of the motor according to the embodiment of FIG. 4.

FIG. 6 is a sectional view of the spindle motor according to another embodiment of the invention. The same numerals designate the same structure. In this embodiment the first stopper is formed at the upper end of the upper portion of the base and the second stopper is formed as a flange monolithically formed with the hub of the rotor. The operation is the same as the other embodiments and the description of it is omitted.

As described above, a means to oppose lifting of the rotor 18 is provided between the stator 18 and the hub 17. A plurality of first stoppers are provided around the upper end of the insulator 16a. The second stopper 26 is provided at the bottom end of the hub 17. The second stopper 26 is in the form of a hollow circular plate. The brushless DC motor of the present invention has higher fidelity in that the rotor is retained in the axial direction and cannot be released by virtue of novel structure of the stator insulator which insulates the base from the stator without any additional structure, and thus without need for additional power. The brushless DC motor of the present invention also has the advantage that it is convienient to adjust the center of the disc, when it is loaded.

What is claimed is:

1. A brushless DC motor for a disc drive comprising:
   a base;
   a coil-wound stator secured to the base;
   a first stopper secured to said stator;

a bearing system forcibly inserted in a bore provided in the base and receiving the shaft so that said shaft is rotatable coaxially within said stator;

a rotor having a hub, a cylindrical wall portion extending downward at a rim of said hub, said rotor being secured to said shaft via said hub, and a magnet secured to an inner circumferential face of said cylindrical wall portion of said rotor so that said magnet faces said stator with an air gap therebetween;

a second stopper secured to said rotor to face said first stopper so that said second stopper and said rotor are retained in an axial direction of the shaft, an insulator between said stator and said base, said first stopper including a plurality of stopper members disposed on and around an upper end of said insulator, said second stopper comprising a flange secured at a lower end of said hub, said stopper members of the first stopper facing said flange to block axial movement of the rotor out of the stator, said rotor having a plurality of guide slots disposed circumferentially and equidistantly in a projection at an upper end of the rotor adapted to be inserted into a hole in a disc when the disc is mounted on the rotor, an elastic member mounted on an outer circumferential face of said hub and engaged on said second stopper, said elastic member having an upper end with a plurality of guide elements arranged therearound and respectively slidably engaged in said guide slots in said projection of said rotor, said guide elements projecting from said slots to engage in the hole in the disc mounted on the rotor to center said disc on the rotor.

2. A motor as claimed in claim 1, wherein said plurality of stopper members of the first stopper extend upwardly from said insulator and have upper ends with inwardly facing projections which overlie said flange of the second stopper with slight clearance.

3. A motor as claimed in claim 2, wherein said insulator comprises a cylindrical portion disposed between said base and said stator and an upper portion and a lower portion extending outwardly on said cylindrical portion to overlie upper and lower ends of said stator.

4. A motor as claimed in claim 1, wherein said elastic member comprises a conical elastomer element, said guide elements being disposed at an upper end of said conical elements, said conical element having a lower end resting on said second stopper.

5. A motor as claimed in claim 4, wherein said conical elastomer element has a circumferential groove therein beneath said upper end.

6. A motor as claimed in claim 1, wherein said elastic member comprises a coil spring engaged around said hub and resting on said second stopper member.

7. A motor as claimed in claim 1, wherein said second stopper includes a cylindrical portion engaged on said hub, said flange of the second stopper extending outwardly of said cylindrical portion.

8. A motor as claimed in claim 7, wherein said elastic member rests on said cylindrical portion of the second stopper inwards of the first stopper.

* * * * *